G. S. OBERDORFF.

WIND-WHEELS AND GEARINGS.

Reissued March 14, 1876.

No. 6,998.

Witnesses;
Gren. Lewis
M. Schenck

Inventor;
Geo. S. Oberdorff
By Hill & Ellmaker
His Attys.

N. PETERS, PHOTO-LITHOGRAPHER, WASHINGTON, D. C.

UNITED STATES PATENT OFFICE.

GEORGE S. OBERDORFF, OF LOWER WINDSOR TOWNSHIP, YORK COUNTY, PENNSYLVANIA, ASSIGNOR TO ELI G. COE, OF SANDWICH, ILLINOIS.

IMPROVEMENT IN WIND-WHEELS AND GEARINGS.

Specification forming part of Letters Patent No. 127,704, dated June 11, 1872; reissue No. 6,998, dated March 14, 1876; application filed March 1, 1876.

*To all whom it may concern:*

Be it known that I, GEORGE S. OBERDORFF, of Lower Windsor township, in the county of York and State of Pennsylvania, (assignor to ELI G. COE, of Sandwich, in the county of DeKalb and State of Illinois,) have invented certain new and useful Improvements in Wind-Wheels and Gearings; and I do hereby declare the following to be a full, clear, and exact description of the same, reference being had to the accompanying drawings, forming part of this specification, in which—

Figure 1:
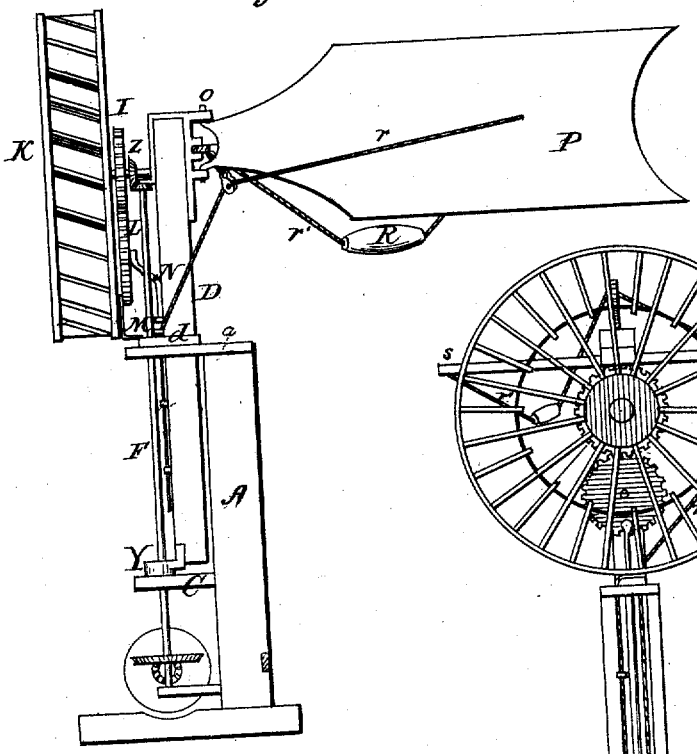
Figure 2:
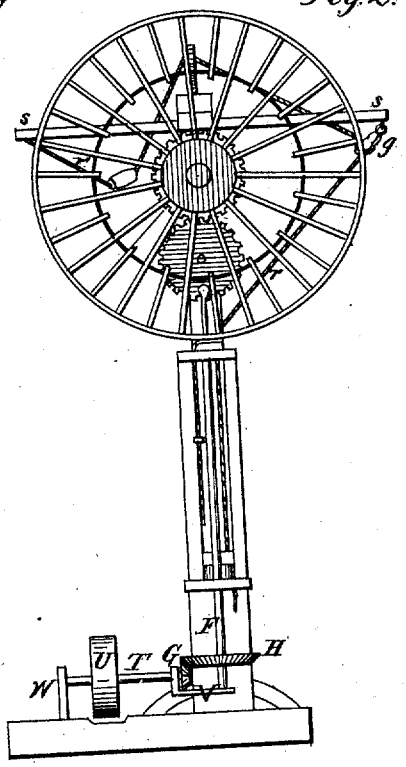

Figure 1 is a side elevation, and Fig. 2 a front elevation.

Similar letters of reference in the accompanying drawings denote the same parts.

The first part of this invention relates to that class of mills which have a revolving vertical wind-wheel and a hinged or flexible tail-vane, so constructed and operating that the wheel is thrown out of action by swinging it around laterally till its plane of rotation comes parallel to the plane of the tail-vane and in line with the direction of the wind, while, as the wind abates, a weight tends to restore the wheel to its normal position for action.

In this class of wind-wheels the usual mode of operation is to first move the tail-vane slightly out of line with the direction of the wind, whereupon the wind, if strong, will at once swing the whole head, so as to bring the tail-vane in line with the wind again and bring the face of the wheel slightly oblique to the wind, and then, having the proper leverage upon the wheel, will force it around laterally till its plane of rotation comes parallel to the plane of the tail-vane, in which position the wheel is no longer capable of action. When the wind sufficiently abates, the weight, overcoming the deflecting force, restores the wheel at once to its normal position for action, with its axis in line with, and its face at right angles to, the tail-vane. This class of wheels have heretofore been liable to the objection that, in their operation, when the wind was not strong enough to overcome the gravity of the weight, the wheel would not be deflected at all, but would continue to work with its face presented to the full force of the air-currents; and when, on the other hand, the wind became strong enough to overcome the resistance of the weight, the wheel, if it began to veer at all, would at once veer through the whole range of its lateral movement, and, if permitted to do so, go out of action altogether by assuming a position parallel to the tail-vane.

The principle of my invention, so far as relates to this part of it, may be stated as follows, viz: so constructing this class of windmills that the force with which the wheel resists the deflecting action of the wind upon it shall vary in direct proportion to the distance of said wheel from its normal position at right angles to the line of the tail-vane.

The advantage of so constructing the mill is that when a slight deflection of the wheel will sufficiently relieve it, this deflection will of itself increase the resisting force till it balances the deflecting force, and the two equal forces, acting in opposite directions upon the wheel, will hold it steadily in the exact position required. If, then, the wind decreases, the resisting force will overcome the deflecting force, and the wheel will swing into the wind till the two forces balance each other again; and, in like manner, if the wind increases, the deflecting force will overcome the resisting force, and will swing the wheel out of the wind till the two forces balance each other. The wheel thus automatically adjusts itself to the varying force of the wind, so as to run regularly with substantially uniform speed and power, using the full effective force of the wind, but preserving itself from accident and injury in case of gales or sudden squalls.

The means by which I prefer to apply this principle in practice consist in combining with the wind-wheel and hinged or flexible tail-vane a weight of varying resistance to counteract the deflection of the wheel; and this part of my invention consists, first, in the application of the principle to said class of windmills; and, secondly, in the mechanical devices by which said principle is so applied.

The second part of my invention is not confined to any particular class of vertical wind-wheels, but consists in a new and improved mode of supporting the wheel, shaft, and vane, for the purpose of greater simplicity, strength, and economy of construction.

The third part of my invention consists in the employment of a horizontal cross-head or yard, attached to the revolving mill-head or topmast, in combination with the flexible or hinged tail-vane and the weight of varying resistance hereinabove referred to, for the purpose of affording suitable purchase or leverage for said weight to accomplish its object effectually.

In the drawings, K is the wind-wheel, having its shaft supported by a vertical post or standard, D, which is free to turn so as to present the wheel to the wind in any direction; and P is the tail-vain, hinged to the rear side of the post or mast D, so that it can turn in one direction to a line parallel to the vertical plane of the wind-wheel, but in the other direction cannot pass the line of the wheel-shaft. *s* is a cross bar or yard rigidly fixed to the mast or turn-post D, in a line practically transverse to the line of the wheel-shaft. *r* is a cord or chain, passing over a pulley, *g*, at one end of the cross-bar, and thence down through suitable guides to a convenient position for persons beneath to operate it, for the purpose of enabling the tail-vane to be shifted by hand so as to throw the wheel more or less out of the wind; and *r'* is another cord or chain, extending in a practically horizontal direction from the opposite end of the cross-bar to a suitable point on the opposite side of the tail-vane, and provided with a weight, R, arranged, preferably, midway between the ends of the cord. When the tail-vane is in line with the wheel-shaft, as it will always be when the wheel is in action with a moderate breeze, the cord *r'* will be most flexed, and the weight will offer comparatively but little resistance to the turning of the tail-vane on its hinge *o*; and, in consequence thereof, the wheel, when thus presented directly toward the wind, will be very sensitive to any deflecting force applied to it, and will readily and quickly move out of the wind as the latter becomes too strong for its safety or its proper action. But as the wheel thus moves out of the wind, it raises the weight and brings the cord *r'* nearer to a straight line; and, in direct proportion as it does this, the leverage of the weight R, and its resistance to the lateral movement of the wheel, are thereby increased, until the draft of the cord upon the wheel in one direction exactly balances the deflecting power of the wind in the opposite direction, when the mill-head comes to rest and the wheel continues to revolve as before at the proper and uniform speed and power. It will be observed that the wind has but little deflecting leverage upon the wheel when the latter first starts from its normal position, but such leverage rapidly increases as the line of the shaft becomes more oblique to the line of the tail-vane. Such increased deflecting leverage of the wind comes at a time when it is least needed, for the farther the wheel is from its normal position, the less distance is it obliged to move to escape from any given amount or increase of wind force. The resisting force should, therefore, slowly increase as the wheel first moves away from its normal position, and then more and more rapidly, in something like geometrical progression, and it will be seen that the above-described arrangement of the weight and cord exactly meets this requirement, allowing the wheel to move less and less to escape a given increment of wind-force the farther it already is from its normal position.

The revolving post or mast D is supported by the standard A, by means of eccentric bearings, *d* Y, attached to the post and working in plates *a* C, fixed to the standard. As the post revolves with its bearings *d* Y, its position is always eccentric to its axis of rotation. This enables me to arrange the working-shaft F, or working-rod M, or both, outside of the mast, and saves the trouble and expense of providing a hollow mast or head for the purpose of accommodating them, it being only necessary to extend such shaft or rod down through suitable holes in the bearing-plates *d* Y, which latter in that case serve as guides and supports for them. The working-shaft may be operated by means of bevel-wheels H G, and the working-rod may at the same time be operated by means of a wrist-pin on a spur-wheel, L, supported by a bracket, N, and gearing with a wheel, I, on the shaft of the wind-wheel. The whole arrangement is very simple and compact, inexpensive in construction, durable, and convenient of operation. The power of the vertical shaft may be applied by any ordinary means, as at T U V W Z. The cross-bar or yard *s*, affixed to the upper end of the mast D and revolving therewith, serves to support the cords *r r'*, and affords them efficient leverage for their action upon the tail-vane P.

Having thus described the construction and operation of my improved windmill, I claim as new—

1. A deflecting wind-wheel which resists the deflecting force in direct proportion to the amount of deflection.

2. The combination of a deflecting wind-wheel, a hinged or flexible tail-vane, and a weight of varying resistance, for the purposes herein set forth.

3. A windmill having its wheel, tail-vane, and working shaft or rod attached to a turn-post which stands eccentric to its vertical axis of rotation, substantially as and for the purposes set forth.

4. In a windmill, the combination of the solid vertical turn-post D with its fixed support, and with a working shaft or rod, or both, arranged outside of it and in line with its axis of rotation, substantially as described.

5. In a windmill having a revolving head or turn-post, a flexible or hinged tail-vane, and a weight of varying resistance, the transverse yard or cross-bar *s* in combination with the cords that operate the tail-vane, substantially as described.

GEORGE S. OBERDORFF.

Witnesses:

FRANK J. MAGEE,

M. H. MAGEE.